US009091377B2

(12) United States Patent
Lechuga

(10) Patent No.: US 9,091,377 B2
(45) Date of Patent: Jul. 28, 2015

(54) INSULATED PIPE AND DUCT MOUNTING ARRANGEMENT

(76) Inventor: Gabriel V. Lechuga, Rancho Mirage, CA (US)

( * ) Notice: Subject to any disclaimer, the term of this patent is extended or adjusted under 35 U.S.C. 154(b) by 618 days.

(21) Appl. No.: 12/929,832

(22) Filed: Feb. 18, 2011

(65) Prior Publication Data

US 2011/0203201 A1 Aug. 25, 2011

Related U.S. Application Data

(60) Provisional application No. 61/306,030, filed on Feb. 19, 2010.

(51) Int. Cl.
*E04C 2/52* (2006.01)
*F16L 13/14* (2006.01)
*F16L 59/18* (2006.01)
*E04D 13/147* (2006.01)

(52) U.S. Cl.
CPC ............... *F16L 13/141* (2013.01); *F16L 59/18* (2013.01); *E04D 13/1475* (2013.01); *E04D 13/1476* (2013.01)

(58) Field of Classification Search
CPC .......... F16L 13/141; F16L 59/18; F24F 7/02; E04D 13/174; E04D 13/17; E04D 13/1476; E04D 13/1475; H02G 3/183; E04B 5/48
USPC .......... 52/198, 199, 219, 220.1, 220.3, 220.5, 52/220.8
See application file for complete search history.

(56) References Cited

U.S. PATENT DOCUMENTS

| 1,112,525 | A | * | 10/1914 | Darling ..................... 248/187.1 |
| 1,258,884 | A | * | 3/1918 | Fife ................................. 285/4 |
| 2,234,640 | A | * | 3/1941 | Austin, Jr. .................... 174/668 |
| 2,307,080 | A | * | 1/1943 | Schaefer ..................... 52/475.1 |
| 2,319,410 | A | * | 5/1943 | Leary ........................... 52/220.8 |
| 3,313,559 | A | * | 4/1967 | Kifer ............................... 285/43 |
| 3,425,456 | A | | 2/1969 | Schibig |
| 3,704,507 | A | * | 12/1972 | Grube ............................. 29/417 |
| 3,722,565 | A | * | 3/1973 | Miller et al. .................. 411/180 |
| 4,071,267 | A | * | 1/1978 | Davis .............................. 285/64 |
| 4,075,803 | A | * | 2/1978 | Alesi, Jr. ...................... 52/220.8 |
| 4,170,430 | A | * | 10/1979 | Mrotzek ......................... 403/20 |
| 4,442,643 | A | * | 4/1984 | Stadheim ........................ 52/219 |
| 4,553,000 | A | * | 11/1985 | Appleton ................... 200/50.29 |

(Continued)

*Primary Examiner* — Rodney Mintz
(74) *Attorney, Agent, or Firm* — Law Office of David Hong

(57) ABSTRACT

An outdoor insulated pipe and duct mounting system includes a wall mounted receiver arranged to receive an insulated pipe or duct provided with an insulation pipe protector which connects and seals to the receiver. The combined system is able to accommodate insulated pipes of different sized diameters and can accommodate one or more inlets within the same receiver with a high degree of flexibility and unique mechanical connection security. The mounted wall receiver system is arranged to receive the insulated piping from any directional angle with a unique full rotation inlet capability. The system serves buildings with outdoor installed air conditioning line sets, insulated pipes, and conduit that have the need to penetrate the building envelope in order to be connected to the buildings indoor mechanical, plumbing, or electrical systems. The system is designed to be installed as an option for new construction applications, to upgrade existing installations, to replace existing installations and for addition to existing installations, but all in an aesthetic and efficient way.

12 Claims, 14 Drawing Sheets

(56) References Cited

U.S. PATENT DOCUMENTS

| | | | | |
|---|---|---|---|---|
| 4,625,469 A * | 12/1986 | Gentry et al. | | 52/3 |
| 4,860,513 A * | 8/1989 | Whitman | | 52/410 |
| 4,864,782 A * | 9/1989 | Hasty | | 52/60 |
| 4,928,349 A * | 5/1990 | Oikawa et al. | | 174/153 G |
| 4,964,594 A * | 10/1990 | Webb | | 244/131 |
| 5,055,334 A | 10/1991 | Lechuga | | 428/99 |
| 5,221,814 A * | 6/1993 | Colbaugh et al. | | 174/66 |
| 5,244,326 A * | 9/1993 | Henriksen | | 411/180 |
| 5,298,701 A * | 3/1994 | Sandor | | 200/50.31 |
| 5,303,730 A | 4/1994 | Trueb | | |
| 5,328,212 A * | 7/1994 | Kosik et al. | | 285/42 |
| 5,360,031 A | 11/1994 | Trueb | | |
| RE34,832 E | 1/1995 | Lechuga | | 428/99 |
| D354,738 S * | 1/1995 | Zimmermann et al. | | D13/169 |
| 5,391,028 A * | 2/1995 | Charles | | 411/374 |
| 5,419,364 A | 5/1995 | Trueb | | |
| 5,427,417 A * | 6/1995 | Lechuga | | 285/46 |
| 5,454,392 A | 10/1995 | Trueb | | |
| 5,472,241 A * | 12/1995 | Kosik et al. | | 283/42 |
| 5,486,650 A * | 1/1996 | Yetter | | 174/53 |
| 5,503,193 A | 4/1996 | Nygaard | | |
| 5,524,669 A | 6/1996 | Trueb | | |
| 5,526,619 A * | 6/1996 | Vagedes | | 52/220.1 |
| 5,540,255 A | 7/1996 | Trueb | | |
| 5,564,463 A | 10/1996 | Helmsderfer | | |
| 5,588,267 A | 12/1996 | Rodriguez et al. | | 52/219 |
| 5,628,484 A | 5/1997 | Lechuga | | |
| 5,678,598 A | 10/1997 | Helmsderfer | | |
| 5,722,699 A * | 3/1998 | Brancher | | 285/142.1 |
| 5,789,702 A * | 8/1998 | Perella | | 174/481 |
| 5,815,996 A * | 10/1998 | Granger | | 52/202 |
| 5,860,256 A * | 1/1999 | Humber | | 52/219 |
| 5,880,420 A * | 3/1999 | Rohmer et al. | | 200/50.28 |
| 5,901,739 A | 5/1999 | Helmsderfer | | |
| 5,907,938 A * | 6/1999 | Sheahan | | 52/410 |
| 5,915,412 A | 6/1999 | Helmsderfer | | |
| 5,941,535 A * | 8/1999 | Richard | | 277/606 |
| 5,970,667 A * | 10/1999 | Thaler | | 52/219 |
| 6,012,763 A * | 1/2000 | Clemente et al. | | 296/186.4 |
| D426,813 S * | 6/2000 | Rohmer | | D13/169 |
| 6,224,309 B1 * | 5/2001 | Yamamoto | | 411/11 |
| 6,314,692 B1 | 11/2001 | Munzenberger et al. | | 52/220.1 |
| 6,357,188 B1 * | 3/2002 | Lee et al. | | 52/220.8 |
| D457,140 S * | 5/2002 | Roesch et al. | | D13/152 |
| D459,312 S * | 6/2002 | Roesch et al. | | D13/152 |
| D462,664 S * | 9/2002 | Roesch et al. | | D13/152 |
| D463,376 S * | 9/2002 | Roesch et al. | | D13/152 |
| 6,448,515 B1 * | 9/2002 | Rohmer et al. | | 200/50.28 |
| 6,455,773 B2 * | 9/2002 | Bellanger | | 174/50 |
| 6,601,351 B1 * | 8/2003 | Zerfoss | | 52/198 |
| 6,637,166 B2 * | 10/2003 | Kinsey | | 52/220.8 |
| 6,723,921 B2 * | 4/2004 | Vagedes | | 174/58 |
| 6,739,353 B2 | 5/2004 | Lechuga | | 137/375 |
| 6,810,568 B1 | 11/2004 | LaCoste | | 29/402.08 |
| 6,870,101 B1 * | 3/2005 | Hull et al. | | 174/58 |
| 6,872,884 B2 * | 3/2005 | Roesch et al. | | 174/50 |
| 6,940,016 B1 * | 9/2005 | Cornett et al. | | 174/58 |
| 6,969,799 B2 * | 11/2005 | Snyder | | 174/483 |
| 7,055,863 B1 * | 6/2006 | Commeville et al. | | 285/46 |
| 7,100,633 B2 | 9/2006 | Lechuga | | 137/375 |
| 7,140,646 B2 | 11/2006 | Parker | | 285/154.1 |
| 7,374,131 B2 * | 5/2008 | Tiid et al. | | 244/118.5 |
| 7,389,616 B2 | 6/2008 | Gilleran | | |
| 7,464,507 B2 * | 12/2008 | Zierer | | 52/220.8 |
| D597,960 S * | 8/2009 | Dinh et al. | | D13/152 |
| 7,730,681 B2 | 6/2010 | Gilleran | | 52/220.8 |
| 7,757,722 B1 | 7/2010 | Lesch et al. | | 138/149 |
| D637,696 S * | 5/2011 | Ball et al. | | D23/259 |
| 7,954,286 B2 * | 6/2011 | Khan et al. | | 52/219 |
| 8,057,144 B2 * | 11/2011 | Johnson et al. | | 411/34 |
| D653,311 S | 1/2012 | Lechuga | | |
| 8,151,821 B2 * | 4/2012 | Ball | | 137/359 |
| 8,205,401 B2 * | 6/2012 | Ward | | 52/198 |
| 8,267,630 B2 * | 9/2012 | Moon et al. | | 411/338 |
| 8,276,854 B2 * | 10/2012 | Mominee et al. | | 248/62 |
| 8,281,800 B2 * | 10/2012 | Ball et al. | | 137/359 |
| 8,307,592 B2 * | 11/2012 | Chang | | 52/220.8 |
| 8,434,982 B2 * | 5/2013 | Henriksen, Jr. | | 411/338 |
| 8,497,424 B2 * | 7/2013 | Castaldo | | 174/50 |
| 8,672,597 B2 * | 3/2014 | Selle et al. | | 411/181 |
| 2002/0108663 A1 * | 8/2002 | Lechuga | | 138/158 |
| 2002/0112761 A1 * | 8/2002 | Lechuga | | 137/375 |
| 2004/0016191 A1 * | 1/2004 | Whitty | | 52/232 |
| 2004/0144045 A1 * | 7/2004 | Granger | | 52/199 |
| 2004/0154662 A1 * | 8/2004 | Lechuga | | 137/375 |
| 2004/0211467 A1 * | 10/2004 | Lechuga | | 137/375 |
| 2005/0172569 A1 * | 8/2005 | Jutras | | 52/219 |
| 2006/0096195 A1 * | 5/2006 | Zierer | | 52/220.1 |
| 2007/0138789 A1 * | 6/2007 | Muenzenberger et al. | | 285/189 |
| 2007/0243037 A1 * | 10/2007 | Pratt | | 411/43 |
| 2010/0011685 A1 * | 1/2010 | Janoski et al. | | 52/219 |
| 2010/0192490 A1 * | 8/2010 | Chang | | 52/220.1 |
| 2010/0269943 A1 * | 10/2010 | Arai | | 138/119 |
| 2012/0216469 A1 * | 8/2012 | Mescall | | 52/220.1 |
| 2013/0078903 A1 * | 3/2013 | Mantyla et al. | | 454/367 |
| 2013/0205693 A1 * | 8/2013 | Scott | | 52/198 |
| 2013/0219821 A1 * | 8/2013 | Andresen | | 52/651.01 |

\* cited by examiner

INSULATED PIPE AND DUCT MOUNTING ARRANGEMENT

CROSS REFERENCE TO RELATED APPLICATIONS

This application is based on and claims the benefit of U.S. Provisional Application No. 61/306,030, filed Feb. 19, 2010, which is incorporated herein by reference.

FIELD OF THE INVENTION

This invention relates in general to certain new and useful and required improvements in the protection of pipe insulated materials from outdoor physical and degradation damage as well as efficient and aesthetic methods to prevent atmospheric air leakage from entering a building. In particular, the invention relates to a pipe and duct installation system which seeks to improve long term optimal energy efficiencies in residential and commercial buildings and to follow the new 2012 Energy Model Codes.

BACKGROUND

There are many challenges with long term optimal energy efficient installations of outdoor insulated pipe and conduit, including the protection of these from ultraviolet exposure, weather, wind, physical and material degradation or both. The degradation of these pipe insulated materials is very important to maintain energy efficiency as the heating or cooling systems depend on the conveyed fluids and the maintaining of temperatures being controlled. These temperatures can be negatively affected by extreme outdoor temperatures and in turn, make the systems work harder and longer than would otherwise be necessary, therefore adding energy consumption.

In addition, building fenestration has also become an important energy efficient issue. The stoppage of outdoor atmospheric air coming into the buildings is a very important issue, as this negatively affects the controlled indoor building temperature and will make the cooling and heating mechanical systems work harder and longer than would otherwise be necessary, and again therefore adding energy consumption.

There are also many associated installation challenges when exterior wall penetration is required including sealing, connecting, aesthetics, maintenance, and flexibility. Many times the multiple amount of Air Conditioning or Heating unit systems and the respective line sets are ganged up in one central location making it difficult for the installer to install, seal, and protect each and every line set. Therefore, there is a need for a receiver that can accommodate the line sets in a quick, efficient, aesthetic, and a systematic battery or gang method. These installations are common in apartment buildings, office buildings and where more than one system is installed in the same area.

There are many different ways that these installations are taking place. More specifically pipe insulation is generally not being protected and the weather exposure causes the degradation of the soft foamed polymers used as insulation. When the pipe insulation is protected, in many instances, adhesive tapes are used. The weather exposure eventually causes the tape adhesives to either fail due to unraveling or fusing to the polymer causing material permeation issues, corrosion, mold, and maintenance issues.

Among the many different methods presently being used is the recess boxing method. This is done by the installer having a metal box fabricated and embedded into the exterior wall and having the line set passing through the box and then sealing all around with a urethane foam or other kind of sealant. In this method, aesthetics and proper long term sealing are inadequate, as the installations look unsightly with unaesthetic unfinished cavities in the wall and the hardened urethane foam materials fail and become cracked therefore leaving air leakage gaps.

There are installations presently being used that make use of single inlet roof flashings which are attached and are embedded to the rough membrane of the exterior wall and which are made of sheet metal, plastic or a combination of both. The flashing is used to contain an area for the line set to go thru a single metal area and other flashings contain a neoprene resilient single area for the seal of the line set that stretches to accommodate different diameters. However there are several set backs to these installation methods. When metal only flashings are used, not only does it become a necessity to seal the line set gap left between the annular metal area of the flashing and the line set to seal for air leakage, but a very difficult to seal hollow area is created. This area is presently being sealed by the usage of adhesive tapes that fail or foam sealers that also eventually fail. The roof flashing is also limited in that it does not allow the installer an option of attachment as the installation always has to be made on the rough wall while construction is taking place. Therefore if the installer misses or forgets to do the installation during construction, it will be difficult to correct the problem later. The other limitation is that the single passageway holds a very thin area that requires a difficult angle to accommodate and lacks surface area continuance, making an efficient installation impossible. This is due to for the most part the extreme directional angles of the piping to be accepted. In addition, whether a plastic or a metal flashing is used or not, the non-supported exterior wall finish material that is terminated at the single neck area radius of the flashing, creates a difficult and unsupported surface area for application of the finish materials. This will leave areas with unfinished material gaps, crevasses, and cracks that cause air leakage. The other limitation of roof flashings is the lack of flexibility of the single opening as the line sets address the wall, from many different angles, before going into or out of the exterior walls. U.S. Pat. No. 5,588,267 to Rodriguez and U.S. Pat. No. 7,730,681 B2 to Gilleran show examples of roof and wall flashings.

In addition there is another installation method that uses an exterior rigid plastic wall shield that is not always economically feasible. Most of the linear line sets are installed in the cavity of the exterior walls. Sealing to prevent air leakage is not a feature in this system. In addition there is a limitation with rigid shields as flexibility has become a challenge and an important requirement for full enclosure of these hard to follow line set patterns.

There has been a need for a complete insulated pipe and duct mounting arrangement in the marketplace. The installer has been having to depend on make shift custom fabrications that leave much room for improvement and are limited on sealing, aesthetics, attachment, and that are time consuming to install. Therefore there is a need for an improved system which is easy to install and highly efficient in operation.

OBJECTS OF THE INVENTION

It is therefore an object of the present invention to provide a wall duct receiver assembly adapted to fit together with a flexible protective cover to provide a long term energy efficient line set installation that will not depend on adhesives, tape, or foam fillers.

It is also an object of the invention to provide a wall duct receiver assembly that incorporates mechanical attachments with improved aesthetics for single and multiple inlets and connections to accommodate insulated pipes and ducts of different sizes.

It is another object of the invention to protect pipe insulation line set materials from physical or ultraviolet degradation, and to provide a wall receiver assembly which is easily removable and reusable for maintenance and with flexible capabilities for full enclosure without the use of adhesive tape.

It is another further object of the invention to mechanically connect a single insulated line set or a multiple insulated line set or a battery of insulated line sets to a single wall receiver that has the ability to seal and secure a single inlet or multiple inlets against air leakage and accommodate different diameters and to include one or more inlets within the same wall receiver.

It is an additional object of the present invention that the wall receiver inlets have a high degree of flexibility that allows for sealing at an extreme angle and offer a 360 degree of high flexibility to accommodate difficult to seal line set patterns.

It is also an object of the present invention that the wall receiver allow for an economic installation solution to allow the longest linear part of the line set to be installed in the exterior wall cavity and yet allow for the soft copper piping bending radius required, to exit at the equipment service point without the need for extra pipe joints or fittings.

It is still a further object of the present invention that the wall receiver be insulated and will seal the area between the wall surface and the receiver to prevent air leakage and that allows for the installation to be directly installed to the finished surface of the exterior wall with mechanical fasteners that are directly anchored or attached to the wall surface.

It is yet another object of the present invention that the wall receiver allows for the utility of an interior wall bracket that will not utilize or perforate the exterior finished wall surface for mechanical fastening attachments but rather will be attached to the rough interior wall by use of nails or screws and in turn will be the attachment or support for the wall receiver with all the required fasteners pre-arranged and for the proper receipt or mounting of the wall receiver.

With the above and other objects in view, my invention resides in the novel features of construction, form, arrangement, and combination of parts and components presently described and pointed out in the claims.

BRIEF SUMMARY OF THE INVENTION

The present invention relates to an insulated pipe mounting arrangement system that fits over a section of an air conditioning line set and receives it at the service point where the mechanical equipment is installed outdoors. This combined system uses two main components each with its own separate components and features. A protective cover that goes over the exposed insulated line set, and a wall receiver that is installed as the connector or transition between the building envelope or exposed insulated line set and the exterior wall penetration.

The line set protective cover can be made of resilient materials like poly vinyl chloride (PVC) or the like, and can be injection molded or plastic sheeting as these materials have been found to contain resistant degradation qualities when exposed in outdoor use. The other materials that can withstand outdoor use for this specific purpose are metal and canvas. However, metal has flexibility, corrosion and cost disadvantages and canvas has issues with moisture rot and attachment limitations. Therefore flexible plastic and the usage of fasteners such as hook and loop or other type of mechanical fastener is ideal for this specific usage. Since wind or tamper resistance is also desirable these protectors will also integrate an extra tamper resistant fastening method with the installation as optional for the installer.

The cover can be made for easy on and off use with a slit and fasteners that are attached for ease of installation or it can be more of a conduit construction with a flexible design. The importance of a service person having access to the line set copper lines is important as this is an area that requires constant repair and maintenance and requires the copper lines to be repaired for leaks. This invention also intends to relate to and accomplish improved and incorporated methods on how to protect insulated pipe for easy, quick and more efficient installations and to make service maintenance inspections quicker and more efficient with removable and replaceable features.

Regardless of the protectors having a slit or non-slit construction, one area of importance is the point of connection with the wall receiver. The wall receiver can be plastic injection molded and made of rigid poly vinyl chloride (PVC) or acrylic butylenes styrene (ABS) or the like and can also be either fabricated or molded and made out of metal. These plastic materials can resist long term outdoor exposure by the use of additives. The inlet that will be receiving the line set and that is mounted on the wall receiver has a radius construction made of plastic that is highly resilient flexible material such as neoprene, silicone or the like. The importance of this material to be highly flexible and resilient is that the specific point of connection is best suited with these features to accommodate different line set diameter sizes so the requirement for highly resilient material is important for multiple size fit capabilities. In addition the radius construction has a tapered design that allows added flexibility to ensure air leakage sealing even when extreme angled line set fitting is required. A tight and flexible fit can then be utilized to prevent building atmospheric air leakage from the inlet. In addition, a secondary holding fastener is also utilized to ensure continued connection security and long term sealing.

Also important is the method of wall attachment that the wall receiver offers. The receiver can be installed with the wall receiver directly bolted to the wall whether backing is used or not. The preferred installation is the combination housing receiver with the wall bracket as this will not require the use of wall penetration for fasteners. The wall bracket is preferably made out of 18 gauge galvanize sheet metal, the bracket can also be made out of rigid plastic and can be injection molded or fabricated.

The wall bracket installs to the rough wall membrane and has apertures for direct nailing or bolting to the rough wall to make the installation quick and easy. The wall bracket has integral fastener receivers that allow the wall receiver to be attached. Once the finish surface is complete, the bracket will then serve as a support and help enhance the sealing with a sandwiching effect as a weather gasket is placed between the wall surface and the back side rim of the wall bracket. Fasteners are also part of the wall receiver assembly and may come in different lengths depending on the wall membrane thickness requirement. The wall receiver also includes fastener openings or apertures that will allow easy installation either directly to the wall or to the wall bracket. The preferred fastener openings are scored with knockout capabilities so that the installer has the option of installation with or without the bracket. The knockout feature prevents air leakage through the fastener apertures which will not be needed to accommodate the fasteners. Caps can also be used to cover the fastener opening areas as well.

This invention possesses many other advantages and has other purposes which may be made more clearly apparent from a consideration of the forms in which it may be embodied. These forms are shown in the drawings forming a part of and accompanying the present specification. For purposes of illustrating the basic principles they will now be described in detail. It is to be understood that the following detailed description and the accompanying drawings are not to be taken in a limiting sense.

DETAILED DESCRIPTION OF PREFERRED EMBODIMENTS

The preferred embodiments described herein are only for purposes of illustration and are not to be understood to be any limitations on the inventive subject matter being described.

Figure 1A:
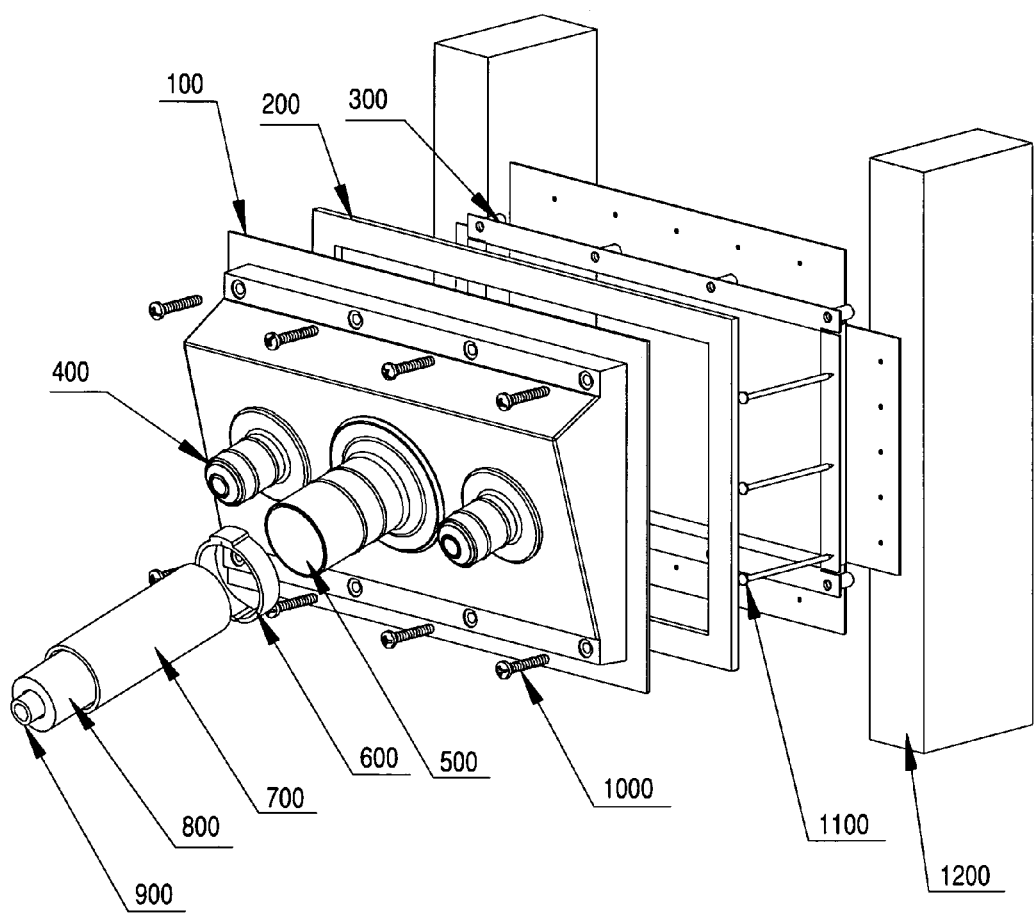
FIG. 1A is a front exploded perspective view showing a complete front view of the wall retainer housing and the wall bracket used with and connected to the insulated pipe line set with a protector.

The preferred embodiment of the insulated pipe ducting and mounting arrangement is a system of FIG. 1A that incorporates a wall receiver 100 with one or more attached continuous inlet ducts 400 and 500 for receiving a pipe or piping 900 covered by insulation 800 and that includes a protector system 700 for the insulated pipe or piping 900 that has been adopted by the new 2012 Energy Codes for the Residential and Commercial Building Energy Model Code Requirements. The codes require that the exposed insulated piping 900 be protected from the outdoor weather exposure and physical damage without the use of adhesive tape. The preferred embodiment described below incorporates many detailed solutions for the many challenges associated with this requirement.

In the preferred embodiment shown in FIG. 1A, the wall receiver 100 has a predetermined and configured angle making it possible to accommodate the piping 900 within a wall cavity defined between adjacent 2x4 studs 1200, and enabling the pipe to be bent to the exterior without kinking. Installations using the least possible fittings are the most desirable ones, as this is a way to minimize friction within the fluids for better efficiency in the running of the equipment that will result in energy efficiencies as well. The refrigerant fluids are carried by the piping 900 which is made of soft copper. The copper piping 900 can be bent by the installer up to a certain degree, which is the standard practice in the plumbing, heating and cooling industry.

The Residential and Commercial Building Energy Model Codes are gravitating into improved and increased pipe insulation, outdoor protected insulation, and fenestration, which is the elimination of heat or cold from atmospheric air leakage and entering into the building and negatively affecting the energy consumption. Therefore in another preferred embodiment, the wall receiver 100 is insulated by a layer of insulation 130 on the back side of the cavity area of the wall receiver 100 as shown in FIG. 2C. The wall receiver 100 in another preferred embodiment has a respective wall bracket 300 shown in FIG. 6A and FIG. 6B that is attached to the rough 2×4 wall studs 1200 of a building as shown in FIG. 1A, by use of nails 1100 or screws which pass through apertures 302 shown in FIG. 6A. The bracket 300 receives a finish wall receiver housing 100 shown in FIG. 1A, assisted and held by fasteners which pass through apertures 301 shown in FIG. 6A that are threaded housings.

Figure 6A:
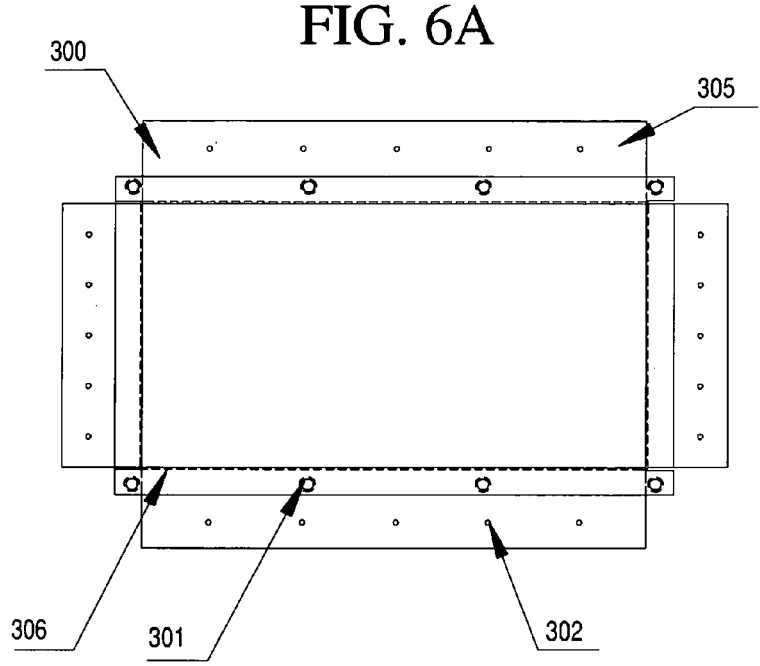
FIG. 6A is a front view of an optional rough wall bracket for attachment of the wall receiver housing to a wall.
Figure 6B:
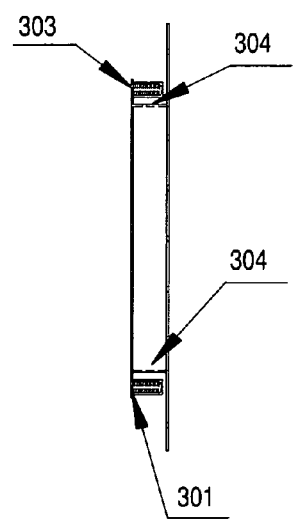
FIG. 6B is a side view of the rough wall bracket of FIG. 6A showing a channel area between the large flanged perimeter area that is directly abutted to the rough wall and the smaller flanged perimeter area that abuts to the gasket and the finish surface area.
Figure 7A:
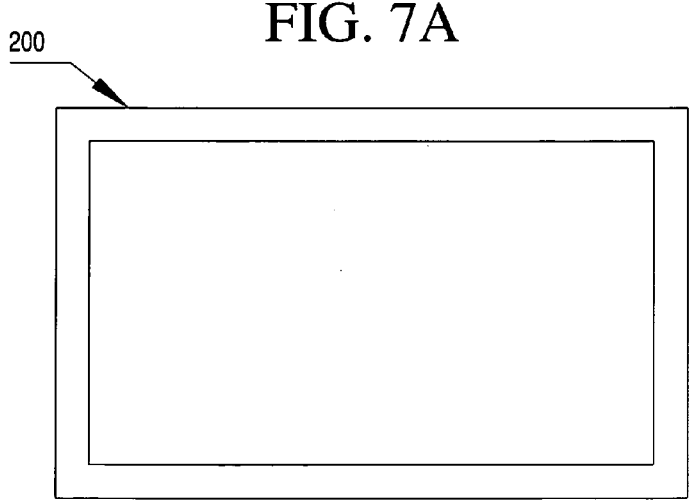
FIG. 7A is a front view of the wall gasket that abuts between the finish surface of the exterior wall and the back side of the perimeter edge flange within the back side of the wall receiver housing.
Figure 7B:
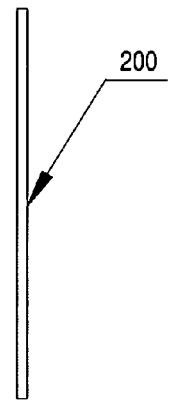
FIG. 7B is a side view of the gasket of FIG. 7A.

In a preferred embodiment shown in FIG. 7A, a gasket 200 is provided for sealing between the wall receiver 100 and the bracket 300 to prevent air leakage. The gasket 200 is assisted by the use of fasteners 1000 shown in FIG. 1A, that engage with threaded apertures 301 as shown in FIG. 6A and threaded housings or fastener receivers 303 shown in FIG. 6B. The wall bracket 300 has a channel 304 shown in FIG. 6B that is formed between the large flange 305 that is nailed or screwed to the rough wall and the small flange 306 shown in FIG. 6A that holds the wall receiver 100. The channel 304 can be changed in dimension, made either wider or narrower, to accommodate thicker or thinner exterior wall thicknesses and the combined wall membrane thicknesses required. In a preferred embodiment the large flange 305 of the wall bracket shown in FIG. 6A can also be formed, bent or constructed into different shapes such as extended ear-like shapes to assist in installing the bracket 300 and to make it easy and efficient to accommodate for different exterior construction types such as masonry exterior wall construction and the like.

Figure 1B:
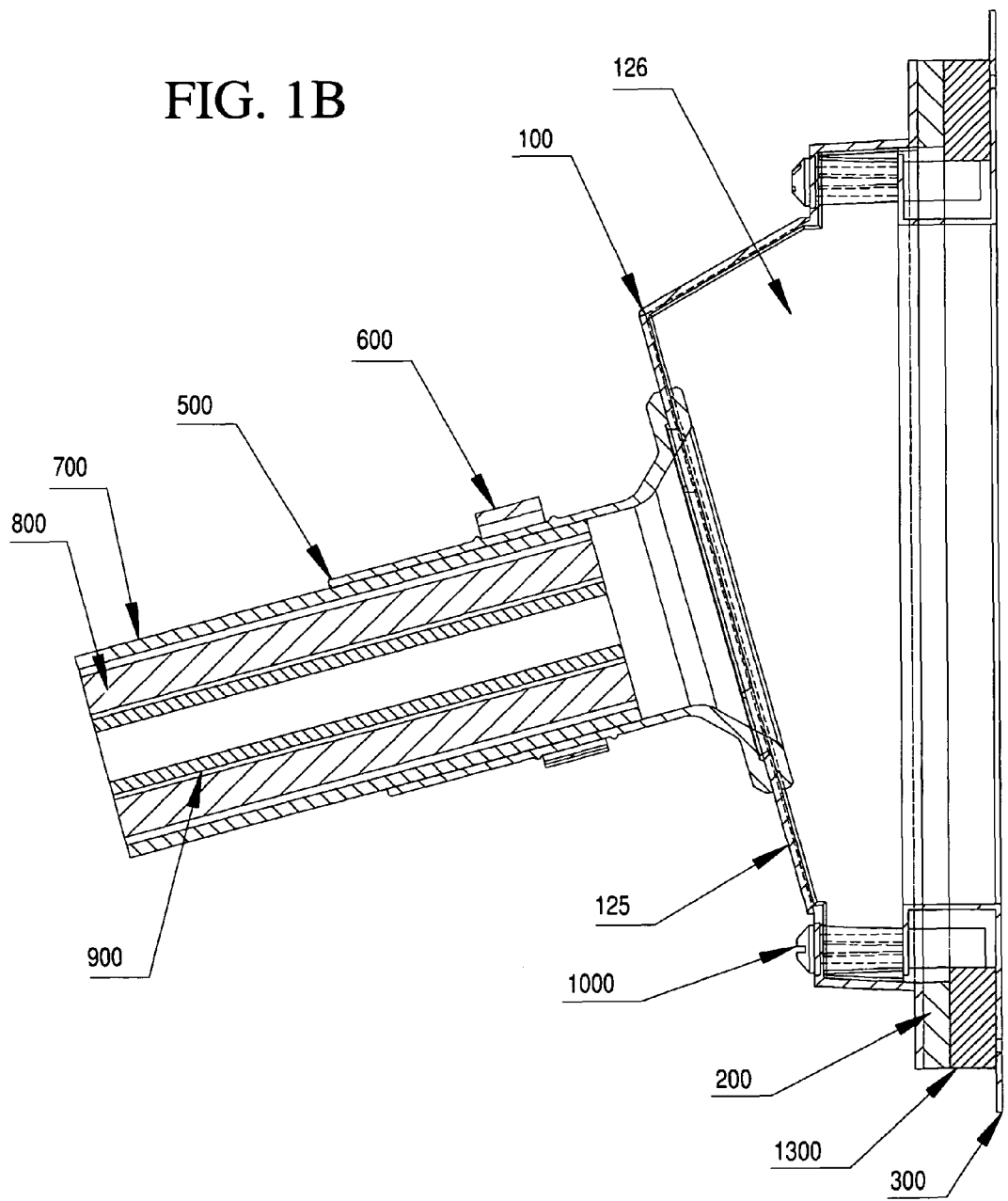
FIG. 1B is an enlarged and detailed sectional side view showing an outdoor exposed installation including a conventional insulated and protected air conditioning or heating exchanger line set and the wall receiver mounting assembly.

The preferred embodiment shown in FIG. 18 incorporates the bracket 300 and the finish wall receiver housing 100, the gasket 200 and the exterior wall membrane 1300 that creates a pressure system to not only seal from air leakage but also offers a fully pressure supported distributed system that creates clamping pressure applied inside and outside the wall to prevent long term cracking, spacing, and a more efficient, uniform, consistent wall surface finished gap and sealed installation. The wall receiver housing 120 shown in FIG. 2A incorporates apertures 121 for fasteners and has a finish edge or rim 124 that supports and allows for any added sealing that may be applied such as weatherproof silicone material caulking around the narrow edge perimeter of the receiver 100. An entry point 122 or points 123 are formed as openings in the slanted front panel 125 the wall receiver 100. As shown in FIG. 1B, the front panel 125 is slanted to provide a cavity area 126 inside the wall receiver 100. The wall receiver 100 shown in FIG. 1A and the respective wall bracket 300 can also accommodate different exterior wall thicknesses with the simple use of either longer or shorter bolts 1000, or threaded rods and threaded nuts, or other type of anchoring fasteners. FIG. 2C shows that the wall receiver 100 can also be insulated by providing a layer of insulation 130 on the back side of the cavity area 126 defined by the slanted front panel 125.

The wall receiver 100, shown in FIG. 1A in a preferred embodiment can also be installed on its own without the use of the rough wall bracket 300. The wall receiver 100 has apertures 121 shown in FIG. 2A to accommodate different types of fasteners that are available to the installers and that are capable of passing through the receiver and wall area, such as bolts, anchor fasteners, toggle fasteners or any combination thereof.

Figure 2A:
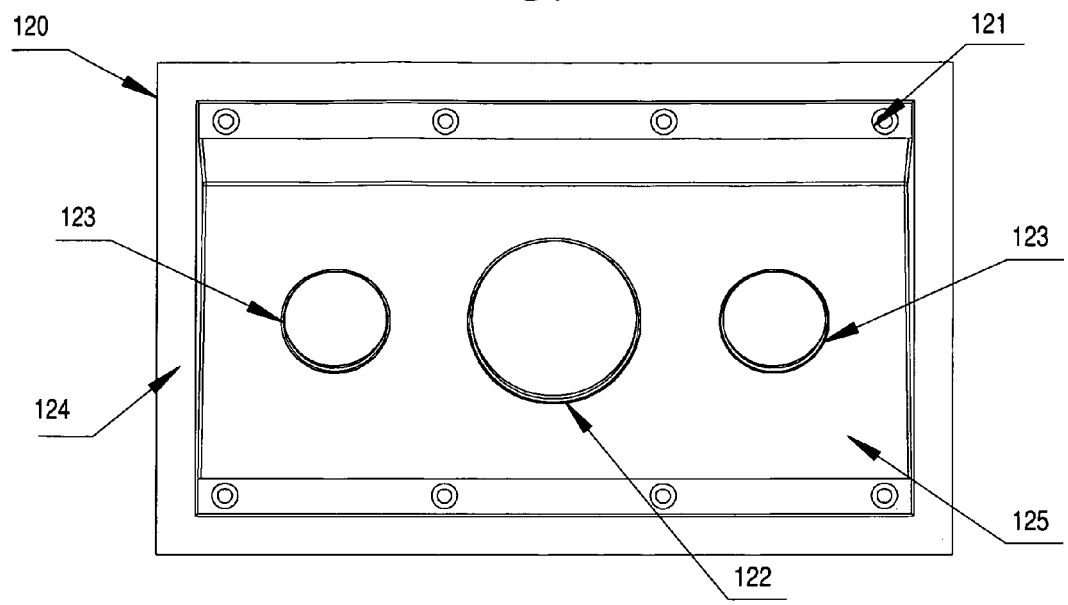
FIG. 2A is a back view of a wall receiver housing only.
Figure 2B:
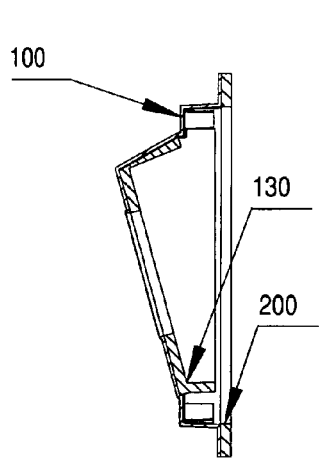
FIG. 2B is a side view of an insulated wall receiver housing.
Figure 2C:
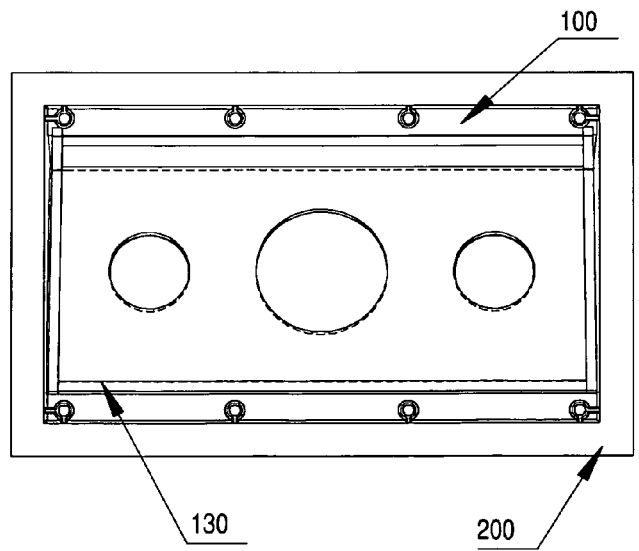
FIG. 2C is a back side view of an insulated wall receiver housing.

In a preferred embodiment the wall receiver 100 may have one or more inlets 400 and 500 with different sizes that are mounted over the wall receiver openings of 122 and 123 shown in FIG. 2A. The inlets may be attached with the wall receiver 100 by the use of elastic material over molding or an attached molded sandwich type insert. As shown in FIG. 5B, a molded plastic insert 404 can be inserted at the back of the inlet 400 to attach the insert 500 to the front panel 125 of the wall receiver 100. The molded plastic insert 404 has a back face or flange 405 which together with a back face or flange 408 of the inlet 400 provides a channel to receive the material of the wall receiver housing 100 in a sandwich-like fashion between the flanges 405 and 408. A molded plastic insert 503 shown in FIG. 4B can be inserted at the back of the inlet 500 to attach the inlet 500 to the front panel 125 of the wall receiver 100. The molded plastic insert 503 has a flange 506 which together with a flange 508 of the inlet 500 provides a channel to receive the material of the wall receiver housing 100 in a sandwich-like fashion between the flanges between the flanges 506 and 508.

Figure 5A:
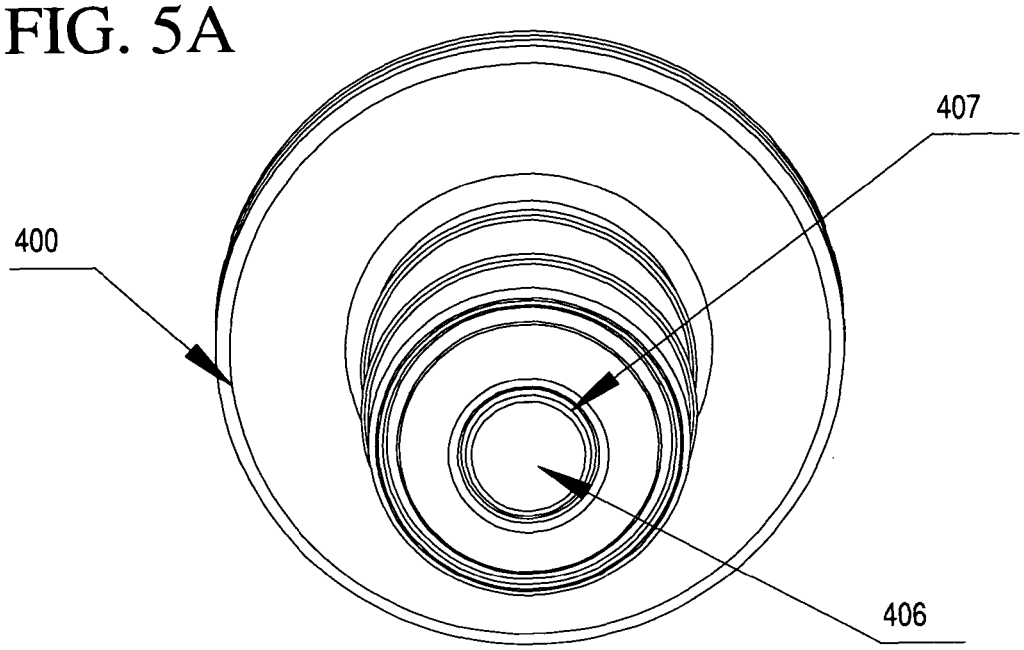
FIG. 5A is a front view of an exterior elastic inlet neck area with a closed or sealed passageway and an end cap area with a score line cutting area to accommodate and seal smaller diameter pipe, conduit or wiring.

In the preferred embodiment, the inlets 400 and 500 of FIG. 1A can be constructed to accommodate pipes of different sizes. Each of the inlets 400 shown in FIG. 1A can have an integral cap 401 or end point with score lines 402 in the end areas so the installer can cut the opening to the desired fit size on the job. Therefore the installer will have a choice of the desired inlet to be opened and used. The inlets shown in FIG. 5A not to be utilized can be air leak sealed within the integral end cap area 406. The end cap area 406 can also contain score lines 407 within different sized diameter areas which can be cut by the installer to accommodate different sizes of pipe conduit and the like. The inlet 500 can be provided with a similar end cap and score lines to allow the size of the opening to be adjusted to accommodate different sizes of pipe conduit.

Figure 4A:
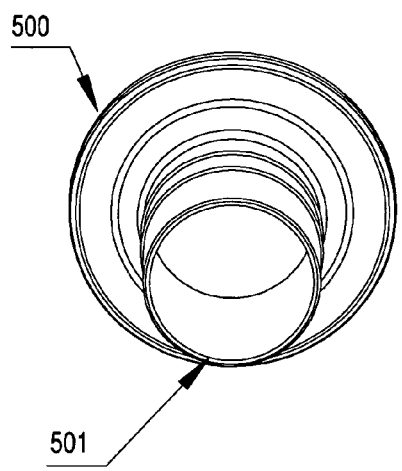
FIG. 4A is a front view of an exterior elastic inlet neck area and its open passageway.
Figure 4B:
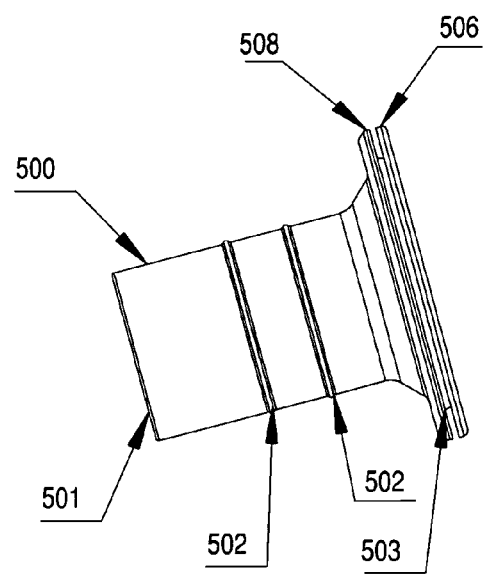
FIG. 4B is a side view of the exterior of the elastic inlet neck area of FIG. 4A with raised areas for secure clamp area and the tapered diaphragm attachment area that allows the wall area of the wall receiver to be accommodated in the tapered area for attachment.
Figure 5B:
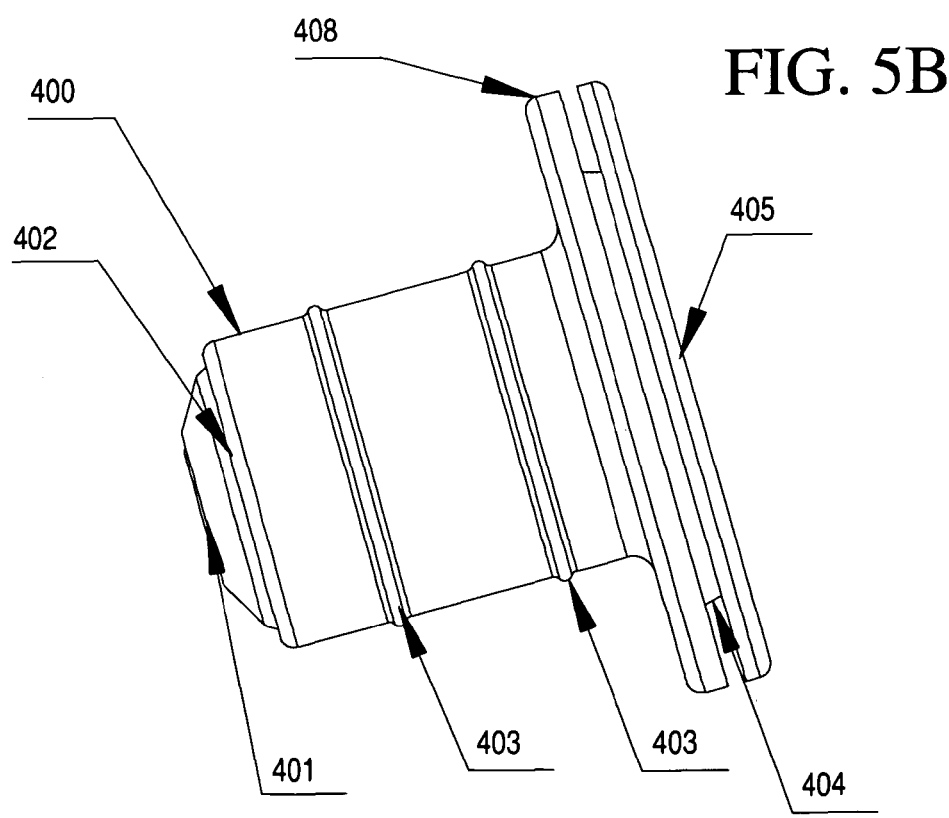
FIG. 5B is a side view of the exterior elastic inlet neck area of FIG. 5A showing the cut score lines, tapered attachment area and the end cap area, including the raised area to secure clamping.

In a preferred embodiment shown in FIG. 4B, the inlet 500 has raised lines or guides 502 which are spaced apart to provide an area for a clamp or ring fastener. Also, as shown in FIG. 5B, the inlet 400 has raised lines or guides 402 and 403 which are spaced apart to designate the area for the clamp or ring fastener. The raised lines 402, 403 and 502 can also be used as cutting line guides or score lines with integral weakened or exterior or internal thinner material lines for cutting to required size, diameter and or length that can be integrated for multiple sizes with a taper or graduated form.

The inlet 500 shown in FIG. 1A, that is attached to the wall receiver 100 has several unique features in its preferred embodiment. The inlet 500 provides a flexible 360 degree universal entry angle capability which is important as the direction of the entry point will be different for the installer in different installations. The receiver inlet 500 may also have a housing that will be integrated into the wall receiver or attached by mechanical means, allowing the inlet 500 to be fully rotatable or to swivel to accommodate any angle that the insulated piping 900 is to be received from shown in FIG. 4C and FIG. 4D.

Figure 4C:
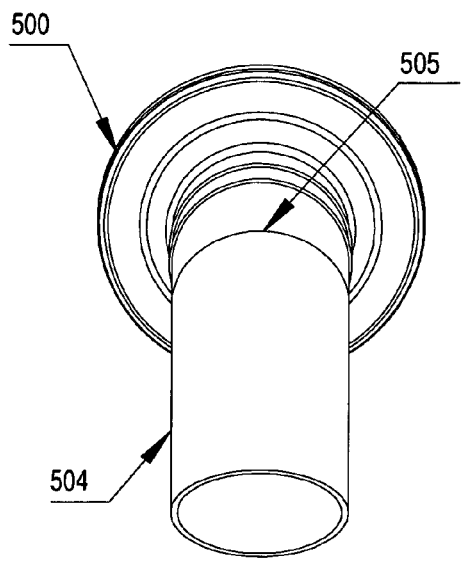
FIG. 4C is a front view of an angled neck inlet.
Figure 4D:
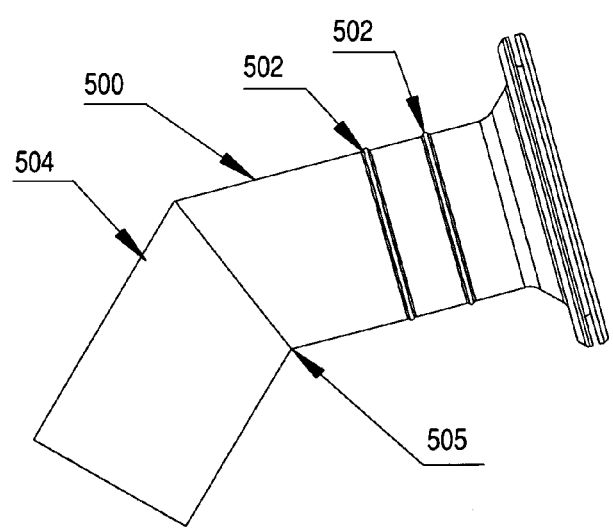
FIG. 4D is a side view of the angled neck inlet of FIG. 4C.

The preferred embodiment inlet shown in FIG. 4C and FIG. 4D can combine an integral angled inlet 504 that can have a built-in orientation in the approximate range of 45, 60, or 90 degrees. The angled inlet embodiment provides for easier accommodation of the insulated piping 900 and the protector 700 that are connected with the inlet 500, mostly from a lower or higher elevation position but most importantly away from the exterior wall. The angled inlet 504 shown in FIG. 4D can easily be rotatable to accommodate piping 900 from different directions. The angled inlet 504 can be cut along the angled score line 505 shown in FIG. 4D for a straighter directional installation.

The preferred embodiment of the inlet 500 has a continuous elongated neck area shown in FIG. 1B and has an inlet continuance that conventional roof flashing of the prior art do not have. The inlet 500 incorporates an internal passageway area 501 shown in FIG. 4A for a higher degree of air leakage deterrence. At the same time the exterior inlet neck area 500 allows for a weather resistant or tamper-resistant connection with the pipe insulated protector, by the added security of a mechanical clamping means 600 shown in FIG. 1A either secured to the wall receiver 100 and or the inlet 500 or both.

Figure 2D:
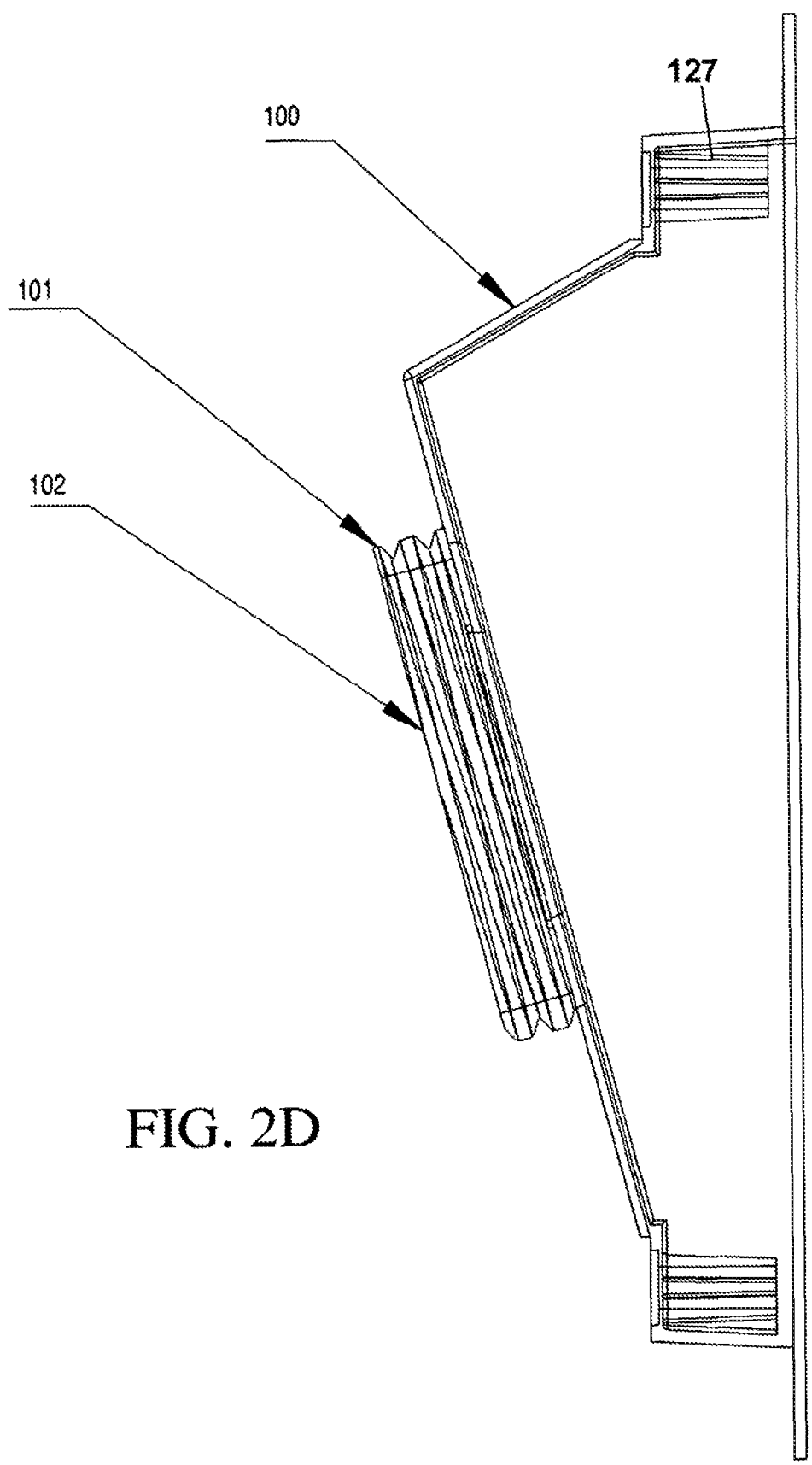
FIG. 2D is a partially cutaway side view of a wall receiver with a threaded mechanical connection construction.

The preferred embodiment of the inlet neck 500 shown in FIG. 1A can be made of a highly resilient and resistant plastic. The inlet neck 500 can be an exposed part or it can be a protected part with a respective housing cover or shade directly attached to the inlet neck 500 or to the wall receiver base or both by means of mechanical attachment. The inlet neck cover 500 shown in FIG. 4B is attached preferably by plastic over molding snap on fastening, bolted, threaded, inserted, or other co-acting fastening components 503. In a preferred embodiment the wall receiver 100, as shown in FIG. 2D, can have a threaded connection 101, which can be integrally molded or attached as a separate part to the construction, to assist in connecting the arranged pipe insulated protector with the wall receiver 100 and also serving as an inlet passageway 102.

In a preferred embodiment shown in FIG. 4A of the exterior neck inlet base area 500, a universally directional and adjustable housing or cover can be provided to cover the highly resilient plastic to prevent atmospheric air leakage into the building. The adjustable housing or cover can be attached to the inlet neck area base 500 or the wall receiver base 100 shown in FIG. 1A or both by means of mechanical attachment. The inlet, its respective cover, or a combination can be both preferably attached or connected by a snap on, bolted or other co-acting mechanical fastening elements.

Figure 3A:
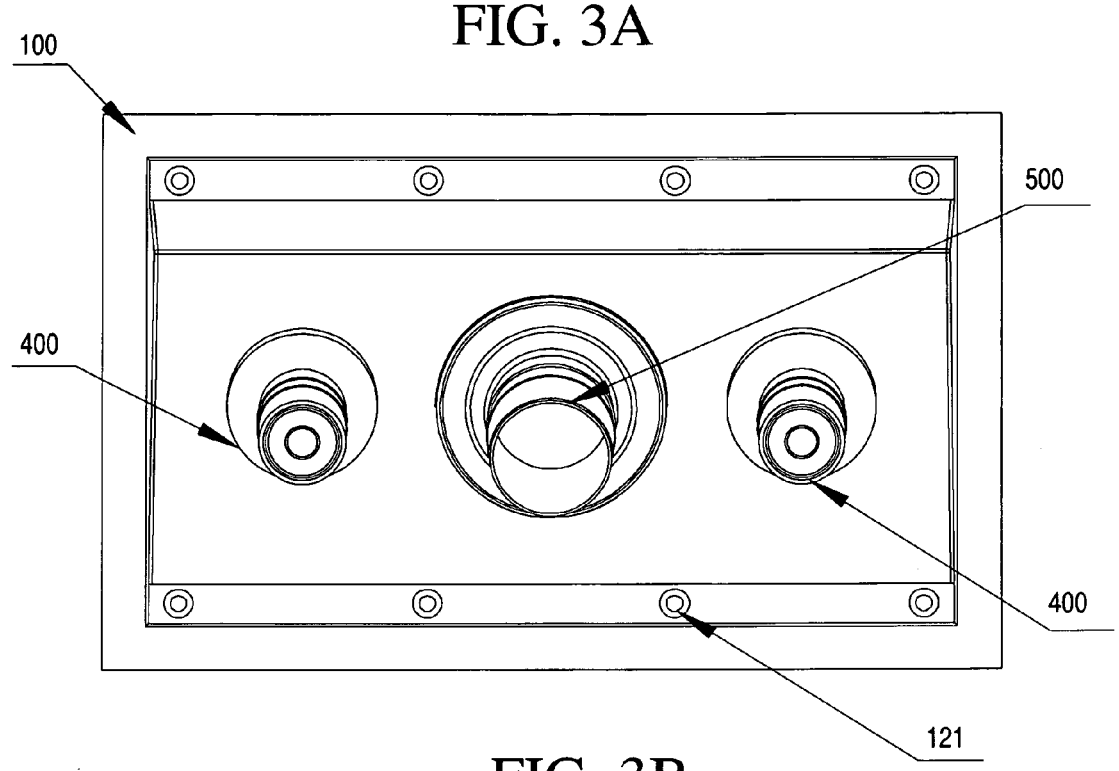
FIG. 3A is a front view of the wall receiver housing with elastic neck inlets.
Figure 3B:
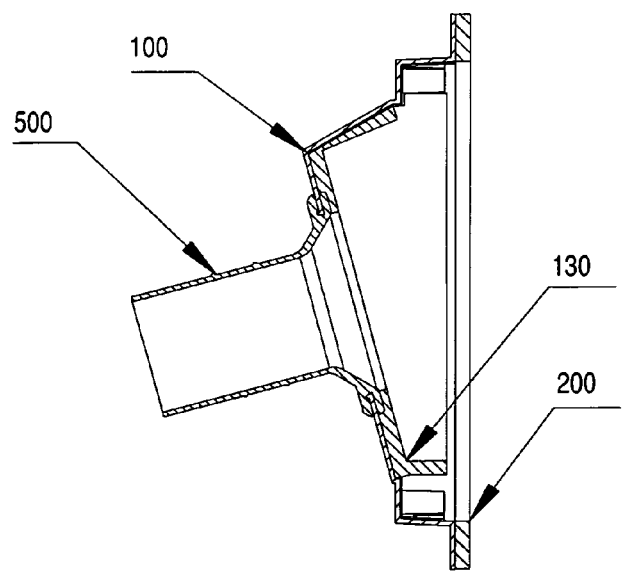
FIG. 3B is a sectional side view of an insulated wall receiver housing with the front elastic neck inlets of FIG. 3A showing a gasket abutted to the back edge at the perimeter of the wall receiver.
Figure 3C:
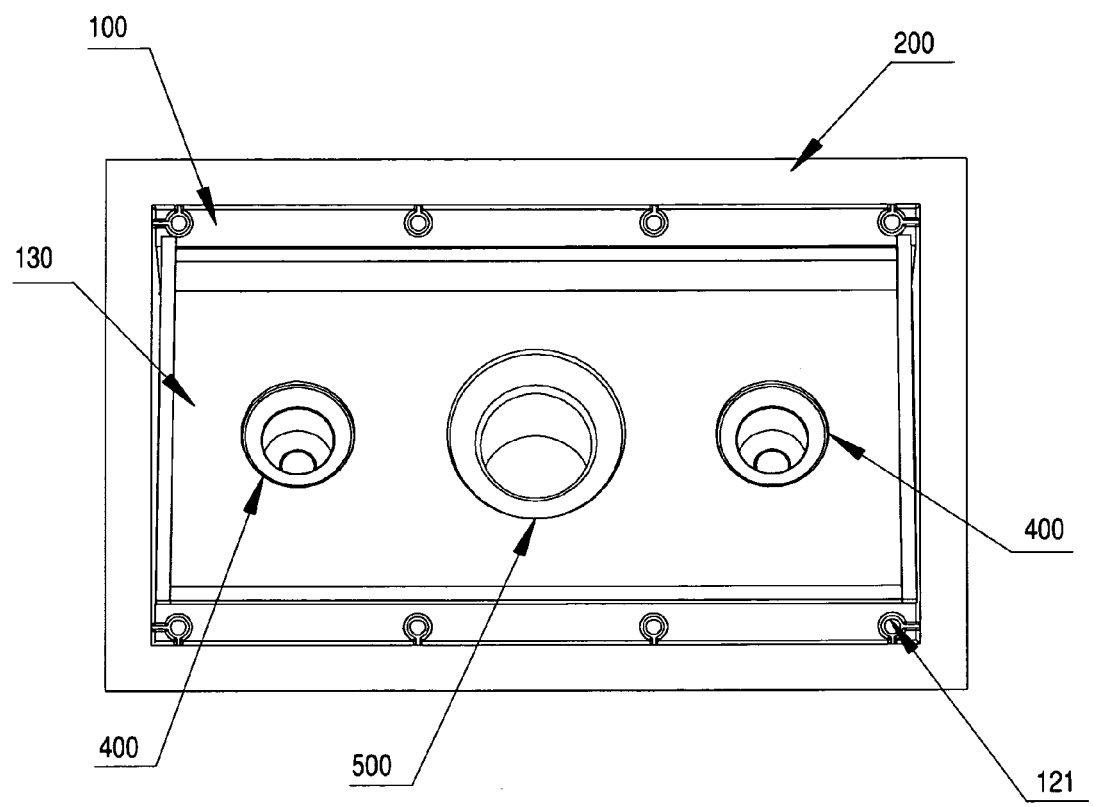
FIG. 3C is a back side view of the insulated wall receiver of FIG. 3A showing the back side of the perimeter of the wall receiver that abuts with the gasket including the tapered inlet neck areas and the fastener passageways 127.

In the preferred embodiment of the inlets 400 and 500 shown in FIG. 3A, the score lines can be arranged with different diameters to allow the selection of multiple diameter sizes by cutting along the score lines to provide the desired diameter needed to be fitted into and or connected to the piping 900.

In a preferred embodiment FIG. 1A both of the inlet neck internal areas 500 and 400 are able to be sized for a multiple diameter passageway of pipe and or conduit types or wiring with score lines 407 for air leak sealing. In a preferred embodiment this can also be used by a step down or tapered diameter down sized constructed inlet. This can also be accomplished in a preferred embodiment by the use of an end cap 406 or an accommodating ring end cap.

The preferred embodiment of the pipe insulated protector 700 shown in FIG. 1A, that connects to the wall receiver inlets 400 and 500, is made of a plastic molded or extruded material that has a flexible construction and is sized to accommodate a multiple and combined amounts of insulated pipe, pipe, wiring, conduit and can be cut to the desired length needed.

Figure 8A:
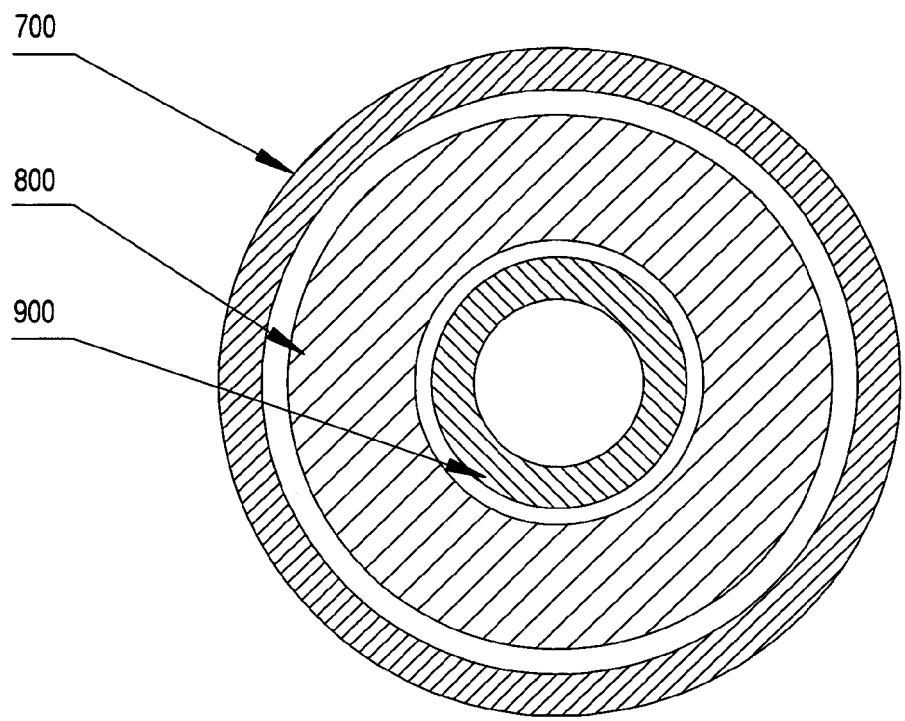
FIG. 8A is a front and enlarged sectional view of the pipe, pipe insulation, and pipe insulation protector.
Figure 8B:
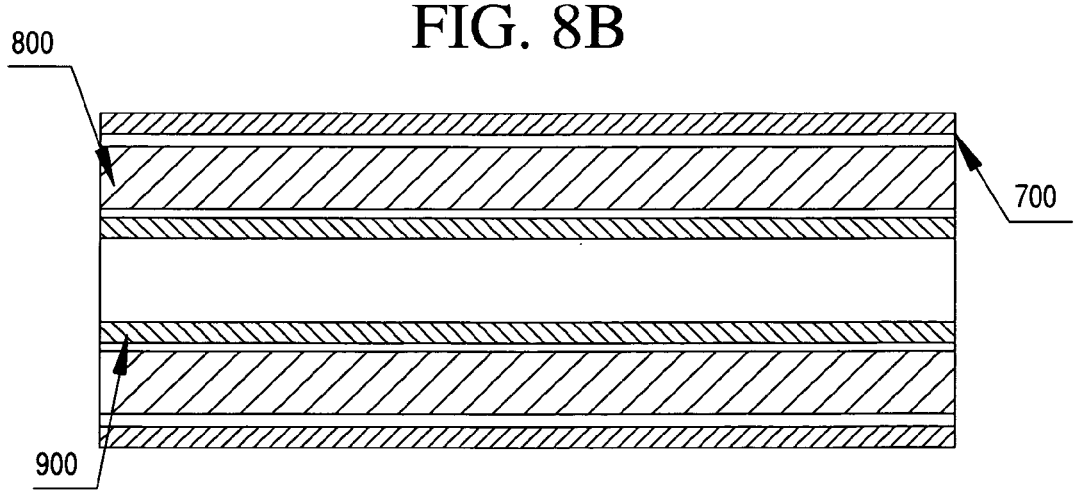
FIG. 8B is a side sectional view of the pipe, pipe insulation and pipe insulation protector line set assembly of FIG. 8A.
Figure 8C:
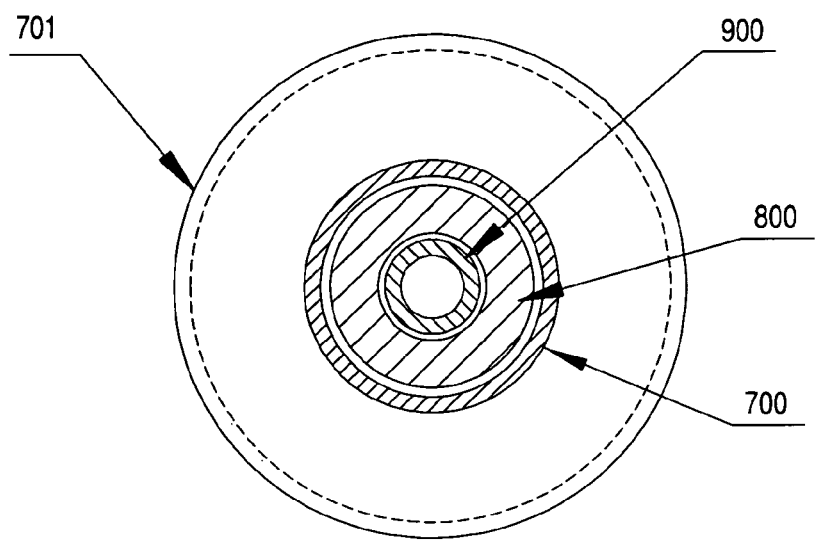
FIG. 8C is a front view of a non-slit protector or conduit construction with the pipe and pipe insulation inside.
Figure 8D:
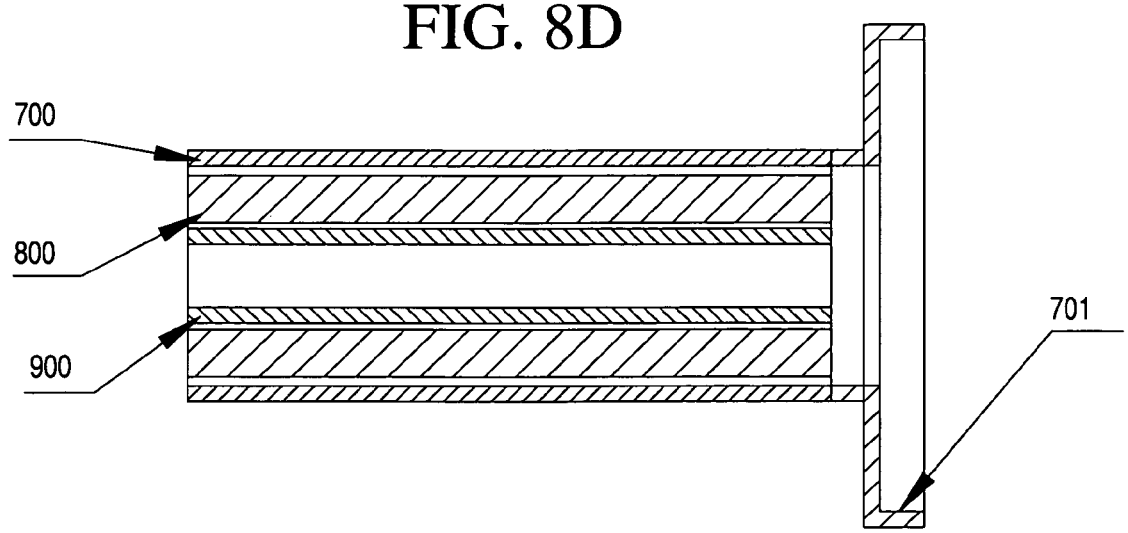
FIG. 8D is a side sectional view of the protector or conduit with an enlarged fastening joint area line set assembly.
Figure 9A:
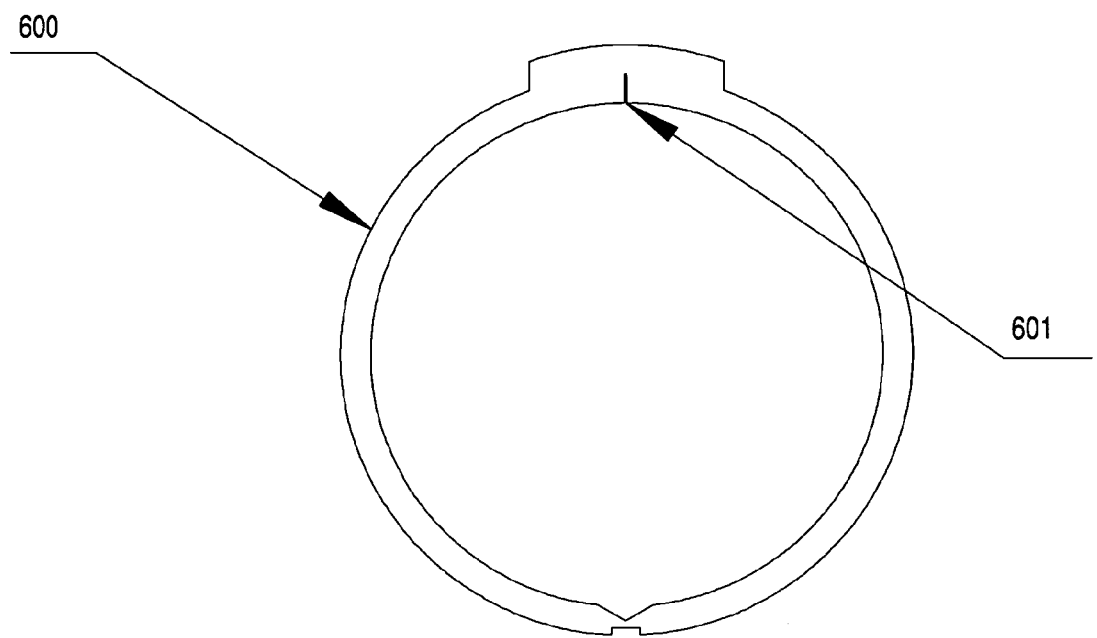
FIG. 9A is a front view of a clamp or ring type securing fastener.
Figure 9B:
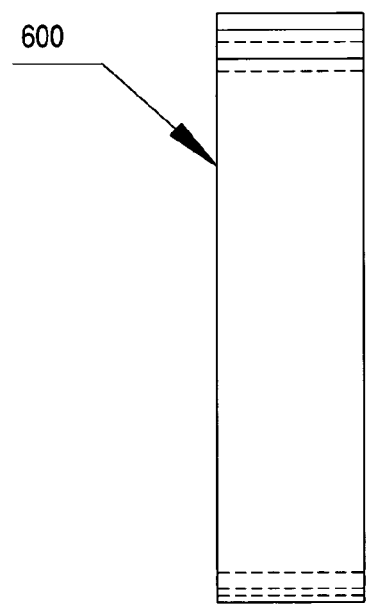
FIG. 9B is a side view of a clamp or ring type securing fastener of FIG. 9A.
Figure 9C:
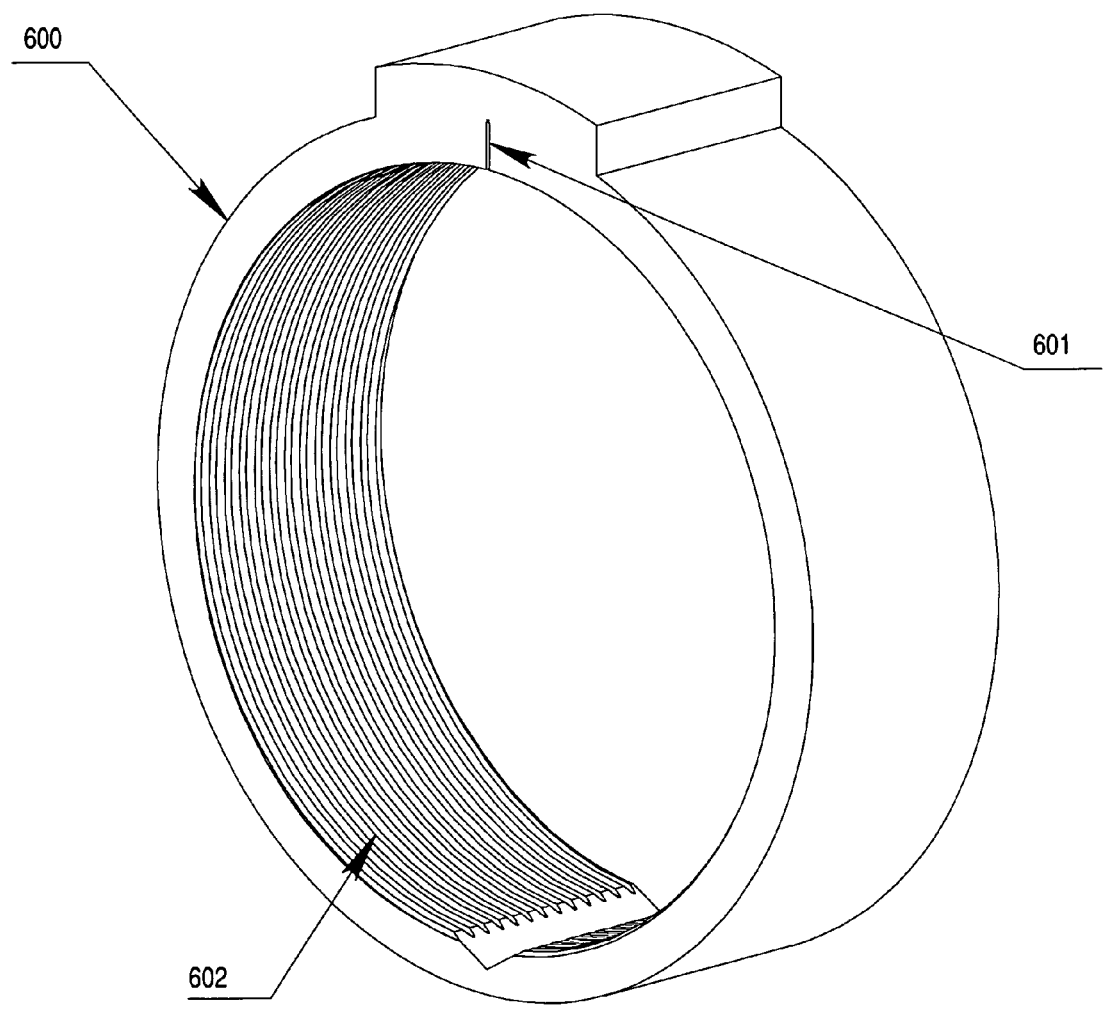
FIG. 9C is a front perspective view of a threaded type securing fastener.

In the embodiment shown in FIG. 8A and FIG. 8B, the insulated pipe protector 700 can be a larger conduit with an internal hollow core passage or a hose-like flexible conduit with a non-slit design, that fits over the pipe 900 and the pipe insulation 800. The installer simply slips or feeds the non-slit protector 700 over the insulated pipe or conduit 900. The protector 700 is then connected with the assistance of a mechanical fastening member shown in FIGS. 9A and 9B which can be embodied as a fastener ring 600 having an integral means of locking and hinging that assist in connecting and securing the ring 600 to the inlet neck 500 that is attached to the wall receiver 100. In a preferred embodiment shown in FIG. 9A, the ring 600 includes a hinge 601 which allows the ring 600 to be clamped to the inlet 500 and to the pipe insulated protector 700. In a preferred embodiment shown in FIG. 9C, the ring 600 has an internal threaded area 602 that co-acts with the threaded area 101 shown in FIG. 2D on the wall receiver housing 100 and allows for the full rotation of the inlet 500 to accommodate the different angles associated with the installation. The flexible hose-like duct 700 can also have an end connection ring or fastener 701 to assist with the co-acting connection as shown in FIG. 8D. In a preferred embodiment a cap fits on the opposite end of the arranged pipe insulation protector 700 to assist in air sealing the passageway from the opposite end.

Figure 8E:
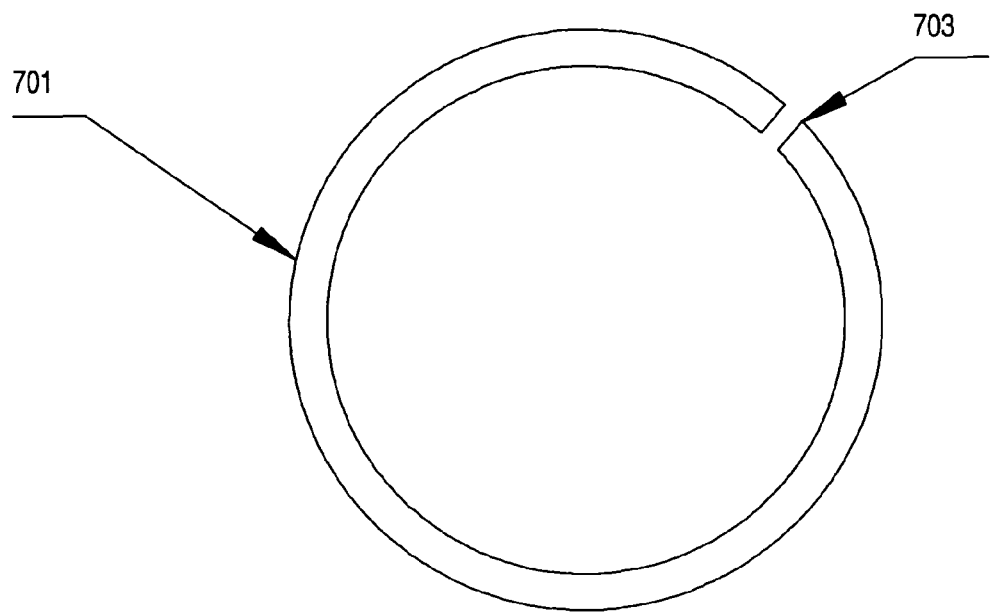
FIG. 8E is a front view of the protector or a conduit for pipe insulation with a slit construction.
Figure 8F:
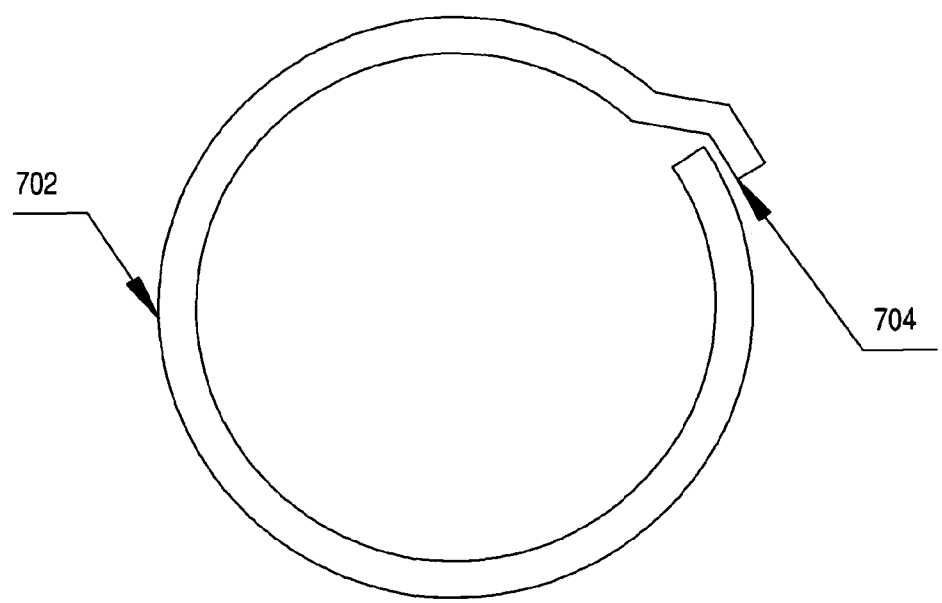
FIG. 8F is a front view of a protector or a conduit for pipe insulation with an overlapping edge construction.

In another preferred embodiment of the pipe insulated protector 700 shown in FIG. 1A that connects to the wall receiver inlet 500, the protector 700 can be embodied as an elongated sleeve 701 of a plastic material that is molded or sheeted and flexible and has a longitudinal slit 703 as shown in FIG. 8E. In a preferred embodiment shown in FIG. 8F, the protector 700 is a protective cover arrangement 702 with an overlapping construction 704, that wraps around the pipe insulation 800 shown in FIG. 1A. The overlapping sections 704 are attached to each other by the use of mechanical fastening such as bolts and apertures, snap on co-acting plastic or metal molded fasteners, or self contacting fiber fasteners or self contacting molded fasteners. The snap on or nut and bolt fasteners can also be installed with the use of eyelets.

In another preferred embodiment the pipe insulation protector 700 shown in FIG. 1A, the protector 700 can be constructed with self contact fasteners such as hook and loop and can also be arranged to accommodate a universal fit for different diameters of insulated pipe by applying a thicker fastening strip or strips on a horizontal manner or a perpendicular manner adjacent to the matching slit closed edges or the over lapped edge closure. The fasteners can be bonded and preloaded with use of molded, sonic welding, radio frequency welding, hot air welding and non adhesive bonding. If hook and loop fasteners are to be used the non adhesive bonding can also be reinforced with threaded stitching for extra weather resistant security. The protective cover 700 can then also be cut to fit and can be cut to the desired length needed.

The invention in its broader aspects is not limited to the specific details of the preferred embodiments shown and described, and it will be appreciated that variations and modifications can be made without departing from the scope of the invention.

The invention claimed is:

1. A receiver adapted for mounting on a building to receive a pipe, conduit or wiring, said receiver comprising:
   a receiver housing provided with a front panel;
   the receiver housing attached to an exterior of the building with threaded screws or bolts and a gasket;
   the receiver housing has a rim, which extends beyond a peripheral edge of the receiver housing;
   the receiver housing having multiple apertures with integrated sockets for guiding the threaded screws or bolts;
   at least one inlet entry opening through the front panel of the receiver housing;
   the at least one inlet entry opening having an inlet port, which projects outward from the front panel;
   each said inlet port having an opening for receiving the pipe, conduit or wiring;
   each said inlet port being made of a flexible elastomeric material;
   each said inlet port has an inlet port flange for engaging the front panel of the receiver housing;
   each said inlet port has at least one inlet port guide, which are spaced apart to receive a port fastener;
   each said inlet port is angled and flexible;
   said port fastener for clamping each said inlet port to the pipe, conduit or wiring; and an insulated pipe cover, which is flexible with a longitudinal slit for wrap-around installation about the pipe, conduit or wiring and is provided with integral cover fasteners.

2. A receiver adapted for mounting on a building to receive a pipe, conduit or wiring, said receiver comprising:
   a receiver housing provided with a front panel;
      the receiver housing attached to an exterior of the building with threaded screws or bolts and a gasket;
      the receiver housing having multiple apertures with integrated sockets for guiding the threaded screws or bolts;
   at least one inlet entry opening through the front panel of the receiver housing;
   the at least one inlet entry opening having an inlet port, which projects outward from the front panel;
      each said inlet port having an opening for receiving the pipe, conduit or wiring;
      each said inlet port being made of a flexible material;
      each said inlet port has an inlet port flange for engaging the front panel of the receiver housing;
      each said inlet port has at least one inlet port guide, which are spaced apart to receive a port fastener;
      the at least one inlet port guide has raised lines;
      each said inlet port is angled and rotatable;
      said port fastener for clamping each said inlet port to the pipe, conduit or wiring; and
   an insulated pipe cover, which is flexible with a longitudinal slit for wrap-around installation about the pipe, conduit or wiring and is provided with integral cover fasteners.

3. The receiver of claim 2, wherein the receiver housing has a rim, which extends beyond a peripheral edge of the receiver housing.

4. The receiver of claim 2, wherein the front panel of the receiver housing is slanted to provide a cavity area within the receiver housing, which is extended away from the exterior of the building.

5. The receiver of claim 2, wherein the receiver housing is attached to the exterior of the building with anchoring fasteners or threaded rods.

6. The receiver of claim 2, wherein the port fastener is a clamp, ring or threaded securing fastener.

7. A receiver adapted for mounting on a building to receive a pipe, conduit or wiring, said receiver comprising:
   a receiver housing provided with a front panel;
      the receiver housing attached to an exterior of the building with threaded screws or bolts and a gasket;
      the receiver housing has a rim, which extends beyond a peripheral edge of the receiver housing;
      the receiver housing having multiple apertures with integrated sockets for guiding the threaded screws or bolts;
   at least one inlet entry opening through the front panel of the receiver housing;
   the at least one inlet entry opening having an inlet port, which projects outward from the front panel;
      each said inlet port having an opening for receiving the pipe, conduit or wiring;
      each said inlet port being made of a flexible elastomeric material;
      each said inlet port has an inlet port flange for engaging the front panel of the receiver housing;
      each said inlet port has at least one inlet port guide, which are spaced apart to receive a port fastener;
      the at least one inlet port guide has raised lines;
      each said inlet port is angled and rotatable;
      said port fastener for clamping each said inlet port to the pipe, conduit or wiring; and
   an insulated pipe cover, which is flexible with a longitudinal slit for wrap-around installation about the pipe, conduit or wiring and is provided with integral cover fasteners.

8. The receiver of claim 7, wherein said insulated pipe cover is clamped to the inlet port by the port fastener.

9. The receiver of claim 7, wherein the front panel of the receiver housing is slanted to provide a cavity area within the receiver housing, which is extended away from the exterior of the building.

10. The receiver of claim 7, wherein the receiver housing is attached to the exterior of the building with anchoring fasteners or threaded rods.

11. The receiver of claim 7, wherein the port fastener is a clamp, ring or threaded securing fastener.

12. A receiver adapted for mounting on a building to receive a pipe, conduit or wiring, said receiver comprising:
   a receiver housing provided with a front panel;
      the receiver housing attached to an exterior of the building with threaded screws or bolts and a gasket;
      the receiver housing has a rim, which extends beyond a peripheral edge of the receiver housing;
      the receiver housing having multiple apertures with integrated sockets for guiding the threaded screws or bolts;
   at least one inlet entry opening through the front panel of the receiver housing;
   the at least one inlet entry opening having an inlet port, which projects outward from the front panel;
      each said inlet port having an opening for receiving the pipe, conduit or wiring;
      each said inlet port being made of a flexible elastomeric material;
      each said inlet port has an inlet port flange for engaging the front panel of the receiver housing;
      each said inlet port has at least one inlet port guide, which are spaced apart to receive a port fastener;
      the at least one inlet port guide has raised lines;
      each said inlet port is angled and flexible; and
      said port fastener for clamping each said inlet port to the pipe, conduit or wiring; and
   an insulated pipe cover, which is flexible with a longitudinal slit for wrap-around installation about the pipe, conduit or wiring and is provided with integral cover fasteners.

* * * * *